United States Patent
Becker

[19]

[11] Patent Number: 5,808,289
[45] Date of Patent: Sep. 15, 1998

[54] ARM MOUNTED PORTABLE DATA COLLECTION DEVICE WITH ROTATABLE AND DETACHABLE DATAFORM READER MODULE

[75] Inventor: Robert J. Becker, Richfield, Ohio

[73] Assignee: Telxon Corporation, Akron, Ohio

[21] Appl. No.: 720,566

[22] Filed: Sep. 30, 1996

[51] Int. Cl.⁶ .................................................. G06K 7/10
[52] U.S. Cl. ........................................ 235/472; 235/462
[58] Field of Search .................................. 235/472, 462, 235/454, 470, 383, 375, 385

[56] References Cited

U.S. PATENT DOCUMENTS

| | | | |
|---|---|---|---|
| 4,766,299 | 8/1988 | Tierney et al. ........................ | 235/472 |
| 4,935,610 | 6/1990 | Wike, Jr. ................................ | 235/472 |
| 4,983,818 | 1/1991 | Knowles ............................... | 235/472 |
| 5,191,197 | 3/1993 | Metlitsky et al. ..................... | 235/472 |
| 5,250,790 | 10/1993 | Metlitsky et al. ..................... | 235/462 |
| 5,272,324 | 12/1993 | Blevins ............................... | 235/472 X |
| 5,319,185 | 6/1994 | Obata .................................... | 235/472 |
| 5,329,106 | 7/1994 | Hone et al. ........................... | 235/472 |
| 5,340,972 | 8/1994 | Sandor .................................. | 235/472 |
| 5,371,348 | 12/1994 | Kumar et al. ...................... | 235/462 X |
| 5,404,001 | 4/1995 | Bard et al. ......................... | 235/472 X |
| 5,477,044 | 12/1995 | Aragon ................................. | 235/472 |
| 5,479,002 | 12/1995 | Heiman et al. ...................... | 235/472 |
| 5,514,861 | 5/1996 | Swartz et al. ........................ | 235/472 |
| 5,539,193 | 7/1996 | Gibbs et al. .......................... | 235/472 |
| 5,539,194 | 7/1996 | Miuer et al. ......................... | 235/472 |
| 5,543,610 | 8/1996 | Bard et al. ......................... | 235/472 X |
| 5,565,671 | 10/1996 | Kirkeby et al. ...................... | 235/472 |
| 5,576,530 | 11/1996 | Hagerty ................................ | 235/472 |
| 5,578,810 | 11/1996 | Bard et al. ........................... | 235/472 |
| 5,587,577 | 12/1996 | Schultz ................................. | 235/472 |
| 5,610,387 | 3/1997 | Bard et al. ........................... | 235/472 |
| 5,657,201 | 8/1997 | Kochis ............................... | 235/472 X |
| 5,675,138 | 10/1997 | La ....................................... | 235/472 |

FOREIGN PATENT DOCUMENTS 2-144681  6/1990  Japan .

Primary Examiner—Donald T. Hajec
Assistant Examiner—Michael G. Lee
Attorney, Agent, or Firm—Watts, Hoffman, Fisher & Heinke Co., L.P.A.

[57] ABSTRACT

An arm mounted portable data collection device comprising a mounting assembly including a docking station and a strap for strapping the docking station to an arm of an operator. A housing is releasably affixed to the docking station. A dataform reading module is supported within a cavity of the housing. The dataform reading module is actuated by a switch adapted to be mounted on an index finger of the user. The dataform reading module is rotatable with respect to the housing and is also detachable from the housing. In a first embodiment of the device the dataform reading module has a single axis of rotation, that is, the module is rotable along a single horizontal plane. In a second embodiment of the device the dataform reading module is rotatable about multiple axis of rotation.

20 Claims, 8 Drawing Sheets

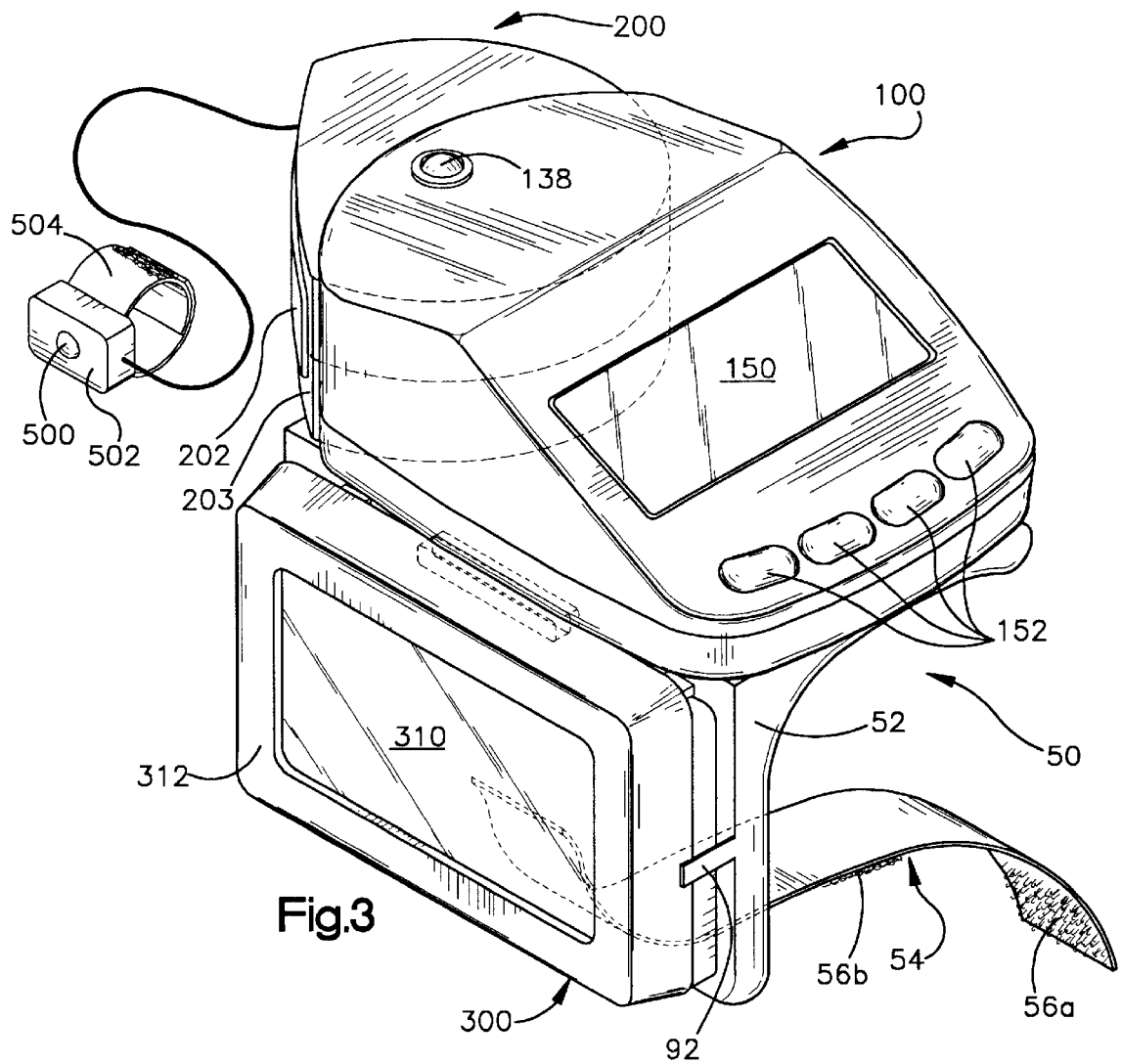
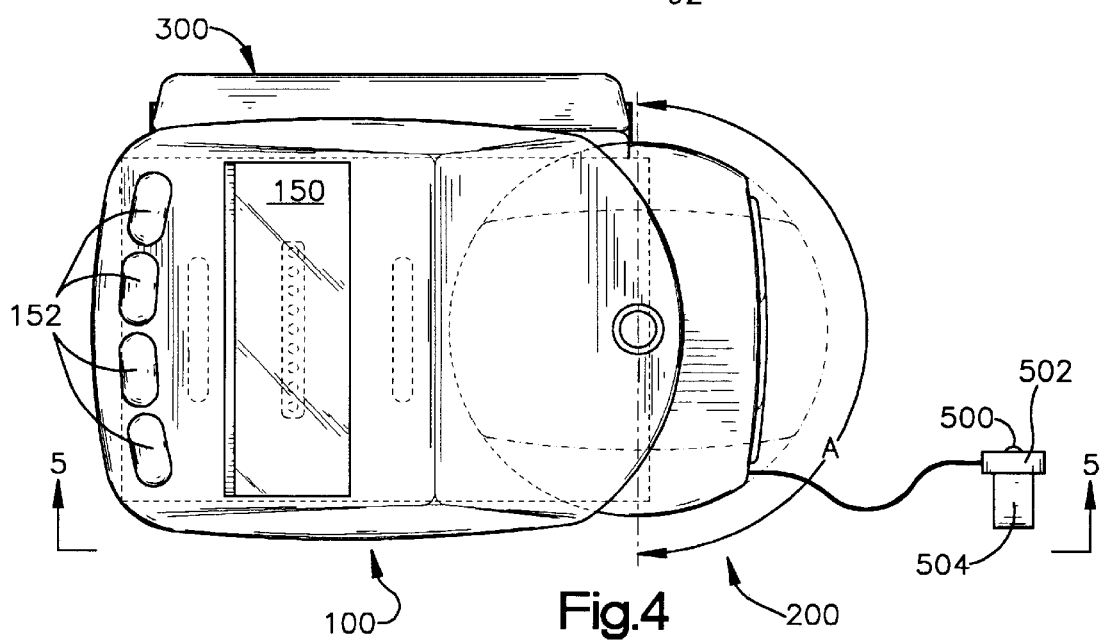

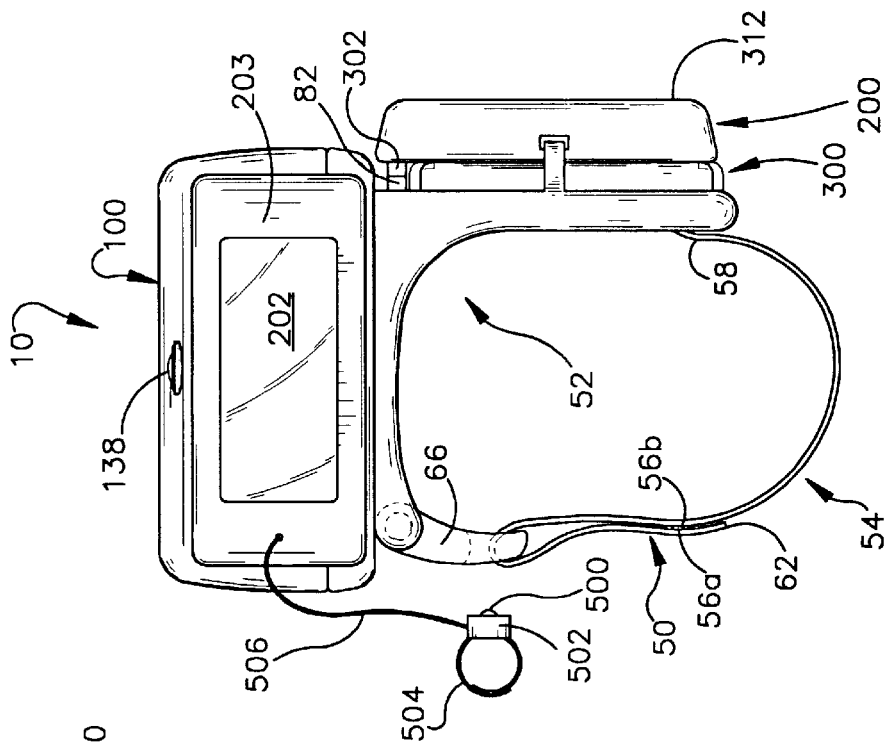
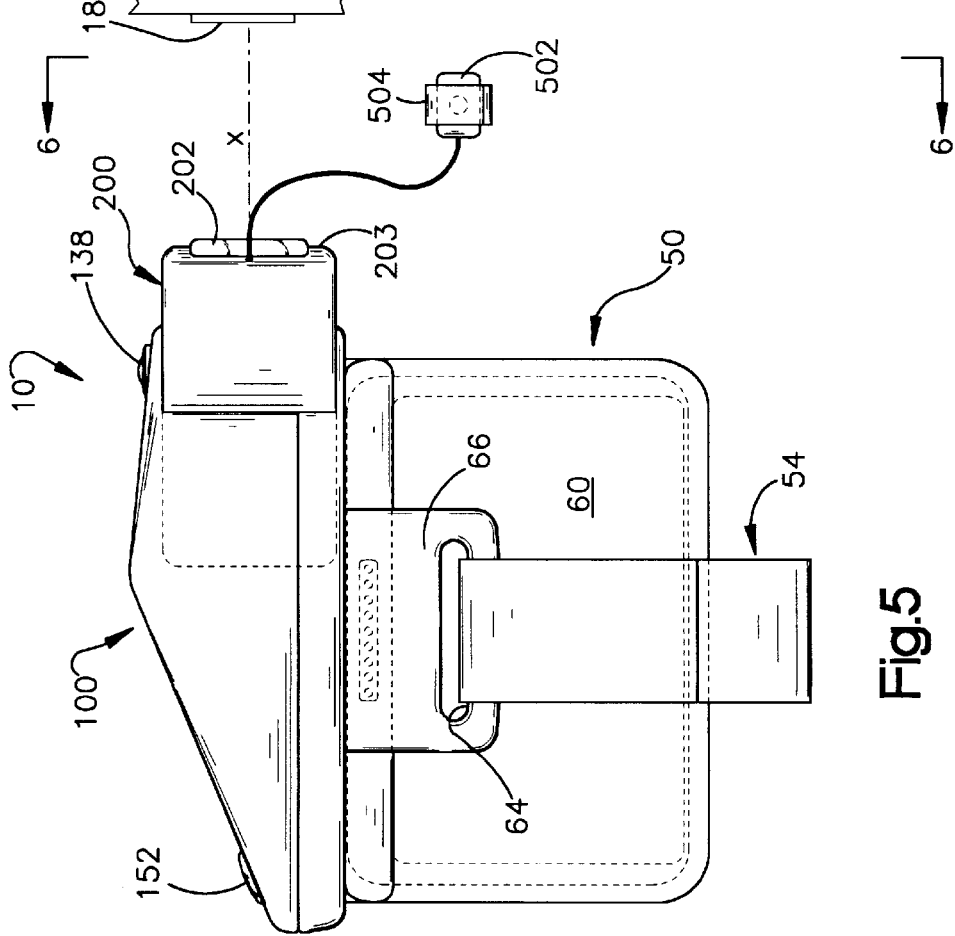
Fig.6
Fig.5

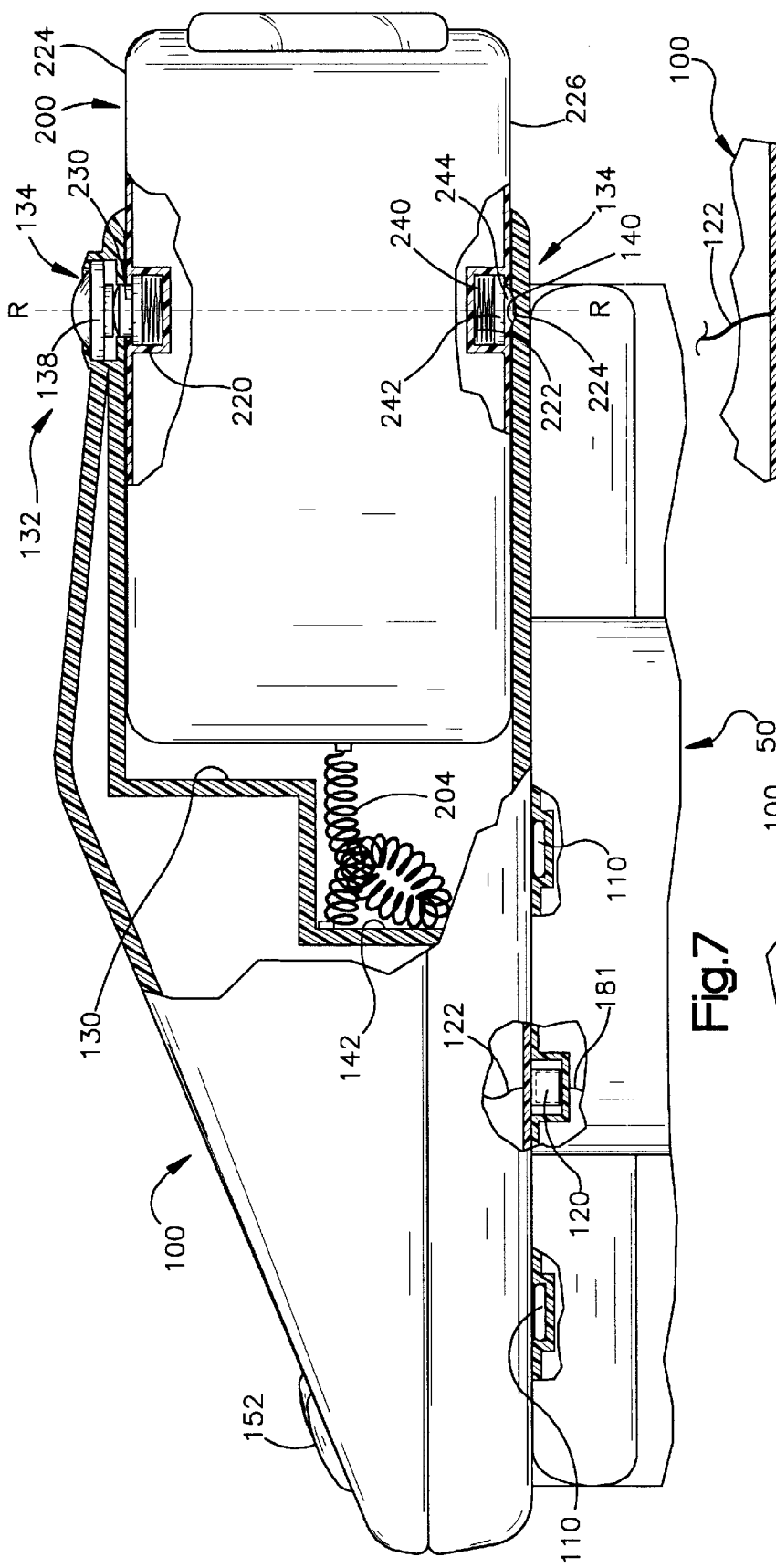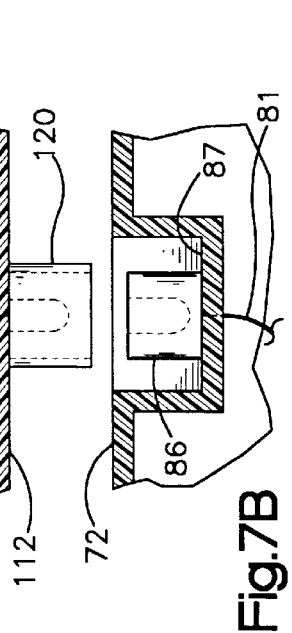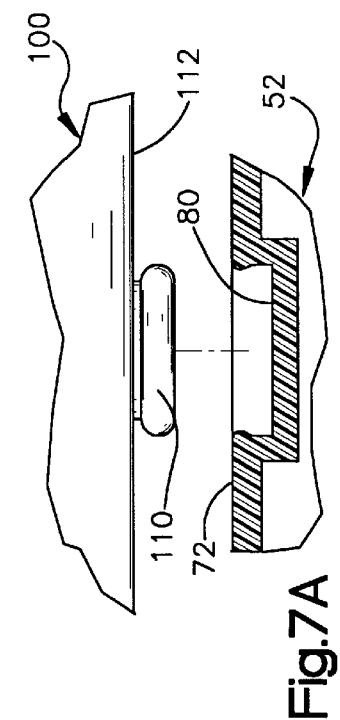

ARM MOUNTED PORTABLE DATA COLLECTION DEVICE WITH ROTATABLE AND DETACHABLE DATAFORM READER MODULE

FIELD OF THE INVENTION

This application relates to an arm mounted portable data collection device and, more particularly, to an arm mounted portable data collection device including a dataform reader module which is rotatable and detachable from the arm mounted device.

BACKGROUND OF THE INVENTION

Portable data collection devices having dataform reading assemblies or modules are widely utilized in both service and manufacturing industries. Such portable data collection devices are often linked to a remote computer via a wireless cellular communication system utilizing spread spectrum communication techniques for updating one or more databases. The mobility of such a portable data collection device permits it to be used for reading one and two dimensional bar code or matrix dataforms at various locations within a facility, between facilities, and/or at remote job sites. If the device includes a two dimensional imaging based dataform reading assembly, the device may also be used to capture an image of a target area.

An operator of a portable data collection device has to use one hand to hold the device even if the device is not being used to read a dataform. If the operator needs two hands to perform some other function, he or she must place the terminal in a safe place, perform the function and return to the device to pick it up. To avoid "tying up" one hand of the operator with the device, various proposals have been advanced for mounting the terminal to the operator's arm thereby leaving both hands free when the terminal is not being used to read a bar code dataform.

In product distribution warehouses, portable data collection devices with dataform reading assemblies are advantageously used by warehouse employees picking goods from shelves or racks to fill orders. An arm mounted portable data collection devices permit an operator to keep both hands free to pick orders. Typically, one or more orders will be input to a memory of the portable data collection device. Each order will include a list of products, corresponding product identification numbers, and the number of units of each product to be selected. An operator using the device will fill an order by walking through the aisles of the warehouse and reading bar code dataforms imprinted on labels affixed to a shelf or rack in close proximity to respective product stocks. The dataform is decoded and the product name and number of units to be selected is displayed on a visual display screen of the portable data collection device. The operator picks the appropriate number of items displayed on the display screen and quickly moves to the next product on the order list displayed on the display screen.

A disadvantage of current arm mounted portable data collection devices is that the bar code reading assembly is fixed in one orientation or position on an operator's arm. Thus, the operator of an arm mounted portable data collection device walking down an aisle must physically turn his or her torso and/or arm so that the dataform reading assembly is properly "aimed" at a target dataform located on a face of the shelf or rack de fining the aisle. Since an operator may read thousands of dataforms in a normal work day, such arm and/or torso twisting movements are both inefficient and may result in operator fatigue and/or muscle strain.

Furthermore, if the target dataform is located on a section of shelf or rack that is below the operator's waist level or above his or her shoulder level, it will be very awkward if not impossible for the operator to read the dataform without removing the device from his or her arm. Removal and reattachment of the portable data collection device from the operator's arm is both time consuming and bothersome to the operator, negates the benefits of the arm mounting of the device and exposes the device to damage and/or loss being no longer mounted on the operator's arm.

What is needed is an arm mounted portable data collection device having a dataform reading assembly or module which is rotatable with respect to the portable data collection device to facilitate reading of dataforms that are positioned on shelves or racks oriented transversely to an operator's direction of travel.

What is also needed is an arm mounted portable data collection device having a dataform reading assembly or module which is detachable from the portable data collection device to facilitate reading of dataforms that are positioned below the operator's waist level or above an operator's shoulder level.

SUMMARY OF THE INVENTION

It is an object of this invention to provide an arm mounted portable data collection device having a dataform reading module and a radio transceiver for communication with a command module via radio frequency (rf) communications.

It is another object of this invention to provide an arm mounted portable data collection device including a dataform reading module which is rotatable with respect to the device.

It is a further object of the invention to provide a portable data collection device including a dataform reading module which is detachable from the device.

It is another object of this invention to provide a command module with receives data representing a scanned or imaged dataform via rf communications from the portable data collection device and decodes the data and communicates at least a portion of the decoded data to a remote host computer via a cellular communications network.

In a first embodiment of the invention, a portable data collection device is disclosed including an arm mounting assembly comprising a docking station and a strap. The docking station is preferably comprised of durable plastic and has an contoured inner surface configured to overlie a portion of an operator's forearm and wrist. The strap is adjustable and extends from the docking station to releasably fasten the docking station to the operator's arm.

The portable data collection device also includes a housing and a dataform reading assembly or module. The housing snap fits onto a first generally planar outer surface of the docking station. The housing supports electronic circuitry of the device including a microprocessor and further includes a small visual display screen such as a liquid crystal display screen for displaying data. The housing also includes a plurality of keys for operator input of instructions to the microprocessor and a cavity or opening in one end configured to releasably receive the dataform reading module. An electrical cable extends between the dataform reading module and the housing to electrically couple electronic circuitry in the dataform reading module to the electronic circuitry in the housing.

Coupled by another electrical cable to the dataform reading module is a depressible switch for actuating the dataform reading module. The switch is secured to a finger of an operator. For example, the switch may be secured by an adjustable strip having mating sections of hook and eye material (e.g., VELCRO®).

The portable data collection device may also optionally include a visual display screen module and a battery pack module which are separately releasably attachable to a second generally planar surface of the docking station. The docking station includes hinged hooks that hold the visual display screen module and the battery pack module. The battery pack module is sandwiched between a back side of the visual display screen module and the docking station second planar surface. The battery pack module provides direct current (DC) power to power regulation circuitry disposed in the housing to power the electrical circuitry of the device while the display screen module includes a liquid crystal display screen which is larger then the display screen of the housing and displays the data displayed on the housing data screen as well as additional data.

The housing includes an attachment assembly which enables the dataform to rotate along an axis of rotation substantially perpendicular to the first planar surface of the docking station. This rotation facilitates reading of dataforms which are disposed to the side of the operator. The attachment assembly further permits the dataform reading assembly to be released from the housing so it can be positioned by the operator to read dataforms disposed below the operator's waist or above the operator's shoulders.

Data representing the read dataform are transmitted by a radio transceiver of the portable data collection device to a command module where the data is decoded utilizing decoding circuitry. At least a portion of the decoded data is transmitted by the command module to a remote host computer utilizing a cellular communications network. Additionally, a portion of the decoded data is transmitted back to the portable data collection device for display to the operator. For example, the operator uses the portable data collection device to read a dataform affixed to a shelf holding inventory of a particular product. Signals representing the read dataform are transmitted from the portable data collection device to the command module. The command module decodes the signals representing the dataform and transmits to the host computer, using the cellular communications network, the decoded product identification number and a stocking location identifier along with an inquiry as to how many items should be in inventory at that stocking location.

The host computer transmits to the command module the number of units that should be in inventory at that stocking location. The command module, in turn, transmits to the portable data collection device the name of the product, the product identification number and the number of units which are supposed to be in inventory at that stocking location. The transmitted information is displayed to the operator to confirm that the product on the shelf matches the product to be pick and also indicates the number of units that should be available so the operator can determine if there is sufficient stock to fill the order or if there is a discrepancy between the purported amount in inventory and the actual number of items at that stocking location. If there is a discrepancy, management will be notified (by pressing a key on the portable data collection device) so that host computer inventory records can be corrected and any other necessary action taken.

In a second embodiment of the portable data collection device of the present invention, the dataform reading module is light bulb shaped and the housing cavity is configured to permit rotation of the dataform reading module along multiple axis of rotation, that is, the module can be aimed anywhere within a conical plane extending from the housing cavity. Like the first embodiment, the dataform reading module is releasable from the housing and can be positioned to facilitate reading of dataforms which are relatively high or low.

Other features and advantages will become apparent from the following description of the preferred embodiment, taken in conjunction with the accompanying drawings, which illustrate, by way of example, the principles of the invention.

BRIEF DESCRIPTION OF THE DRAWINGS

FIG. 3 is a perspective view of the portable data collection device of FIG. 1 with a dataform reading module fully rotated to the left in a housing of the device;

FIG. 4 is a top plan view of the portable data collection device of FIG. 1;

FIG. 5 is a side elevation view of the portable data collection device of FIG. 1 as seen from a plane indicated by the line 5—5 in FIG. 4;

FIG. 6 is a back elevation view of the portable data collection device of FIG. 1 as seen from a plane indicated by the line 6—6 in FIG. 5;

FIG. 7 is a view, partly in side elevation and partly in section, of a portion of the portable data collection device of FIG. 1 showing the attachment structure of the housing to a docking station and the mechanical and electrical attachment structure of the dataform reading module to the housing;

FIG. 7A is a view, partly in side elevation and partly in section, of a portion of the mechanical attachment structure of the housing to the docking station;

FIG. 7B is a view, partly in side elevation and partly in section, of a portion of the electrical interface of electronic circuitry of the housing to the docking station;

DETAILED DESCRIPTION

Figure 1:
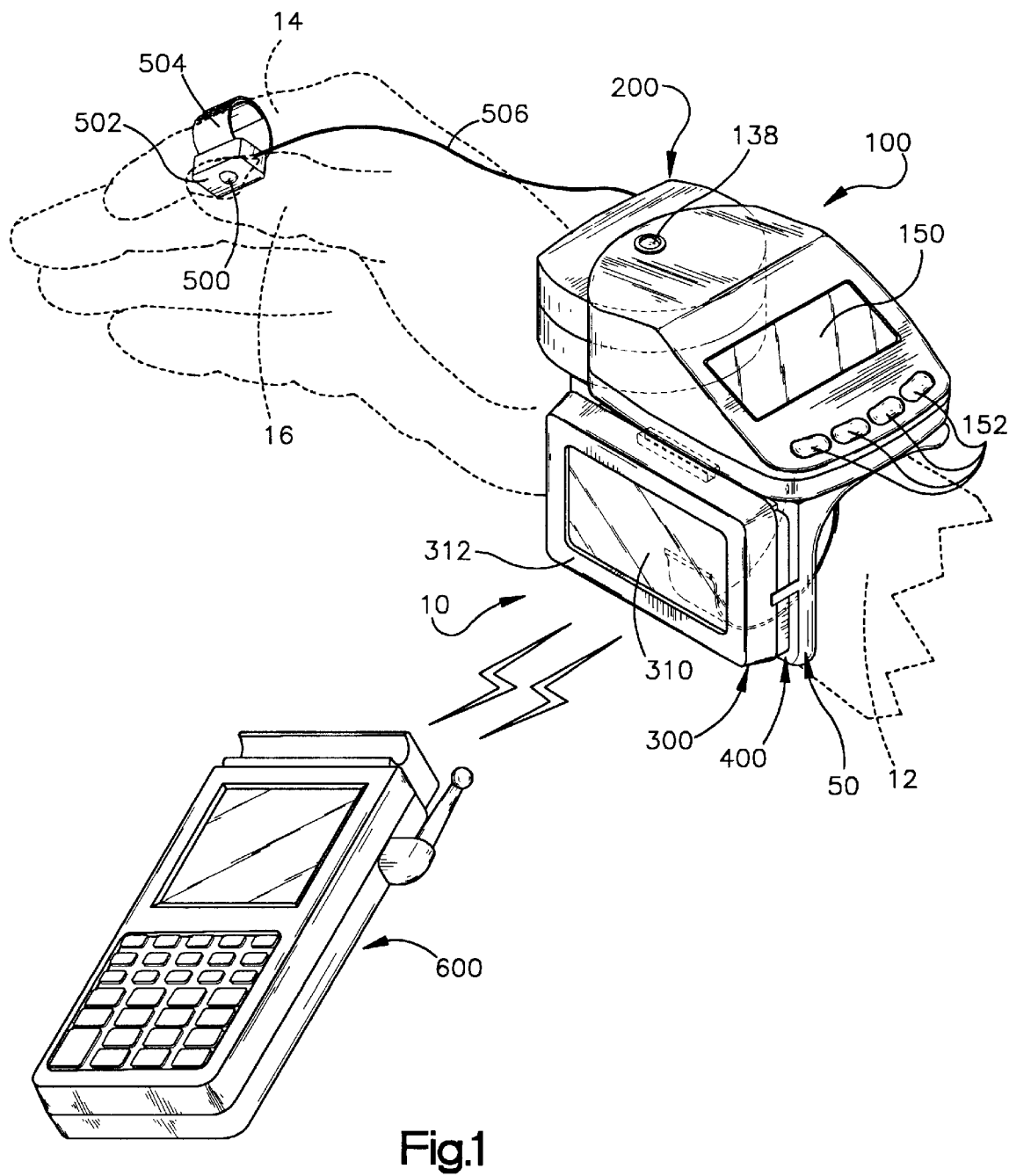
FIG. 1 is a perspective view of a portable data collection device of the present invention mounted on an arm of an operator.

Turning to the drawings, a first embodiment of the portable data collection device is shown generally at 10 in FIG.

1 mounted on a lower portion of an arm and wrist 12 of an operator. For purposes of this application, including the claims, the term "arm mounted" includes devices which are mounted on the operator's hand, wrist, lower (forearm) portion of the arm or upper portion of the arm. The device 10 includes an arm mounting assembly 50 for releasably affixing the device to the operator's arm 12. The arm mounting assembly 50 supports a housing 100 defining an interior region in which electrical circuitry of the device is disposed. The housing 100, in turn, supports a dataform reading assembly or module 200 which is rotatable with respect to the housing and the arm mounting assembly 50. Removably affixed to the arm mounting assembly 50 is a visual display screen module 300 and a battery pack module 400. The portable data collection device 10 is part of a data collection system 11 which includes a command module 600. The portable data collection device functions as a dataform reading peripheral unit of the command module 600.

Preferably, the portable data collection device 10 and the command module 600 communicate via radio frequency (rf) signals permitting the command module to be physically separated from the portable data collection device (e.g., the command module located in an office of a warehouse where the portable data collection device is being used to pick orders in the warehouse). Alternatively, however, the command module 600 may be hardwired to the portable data collection device. In a preferred function embodiment of the portable data collection device 10, the device reads a one or two dimensional bar code or matrix dataform and signals representing the dataform are transmitted to the command module 600 for decoding. Alternately, the portable data collection device 10 may include decoding circuitry for decoding a read dataform and signals representing decoded data would be transmitted to the command module.

The dataform reading module 200 is actuated by an actuation assembly. The assembly includes a normally open switch 502. Depressing an actuation button 500 closes the normally open switch 502 and initiates a dataform reading session. The switch 502 is mounted to an index finger 14 of the operator by a strap 504 which is fastened to a back side of the switch. The strap 504 includes a hook and eye strip (such as a VELCRO® strip) at each end of the strap to secure the switch 502 to the operator's finger 14. The switch 502 is positioned on the operator's index finger 14 such that it is readily depressed by a thumb 16 of the operator. An electrical cable 506 electrically couples the switch 502 to electronic circuitry disposed in the dataform reading module 200.

Alternatively, if a microphone and speech recognition module is provided, the dataform reading module 200 may be configured to actuate upon a voice command from the operator. Another alternative would be to provide the dataform reading module 200 with dataform recognition circuitry. With such circuitry, the dataform reading module would automatically read any dataform entering within a target or reading zone of the module.

Figure 2:
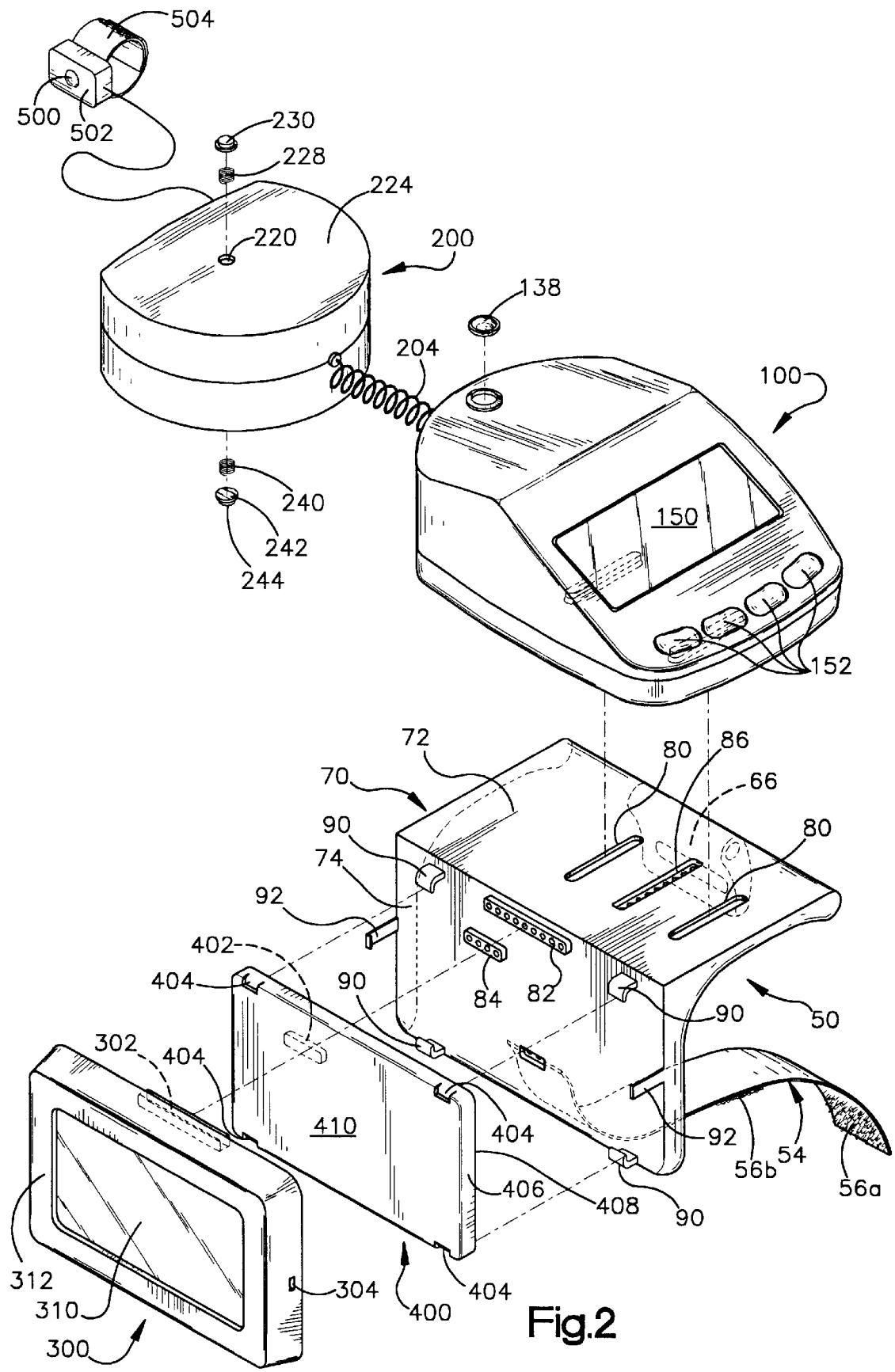
FIG. 2 is an exploded perspective view of the modules of the portable data collection device of FIG. 1.

As can best be seen in FIGS. 2, 5 and 6, the arm mounting assembly 50 comprises a right angled docking station 52 and strap 54 with mating sections of hook and eye material 56a, 56b affixed thereto for adjustably strapping the docking station 52 to the operator's arm 12. The docking station 52 is preferably fabricated of plastic while the strap 54 is comprised of a flexible, elastic material. One end 58 of the strap 54 is affixed to an inner surface 60 of the docking station 52. An opposite end 62 of the strap 54 is looped through a slotted opening 64 in a hinged extension 66 which pivots with respect to the docking station 52. The strap 54 is approximately one inch wide. As can best be seen in FIG. 6, the docking station inner surface 60 is contoured to comfortably fit over the wrist and arm 12 of the operator.

Figure 7C:
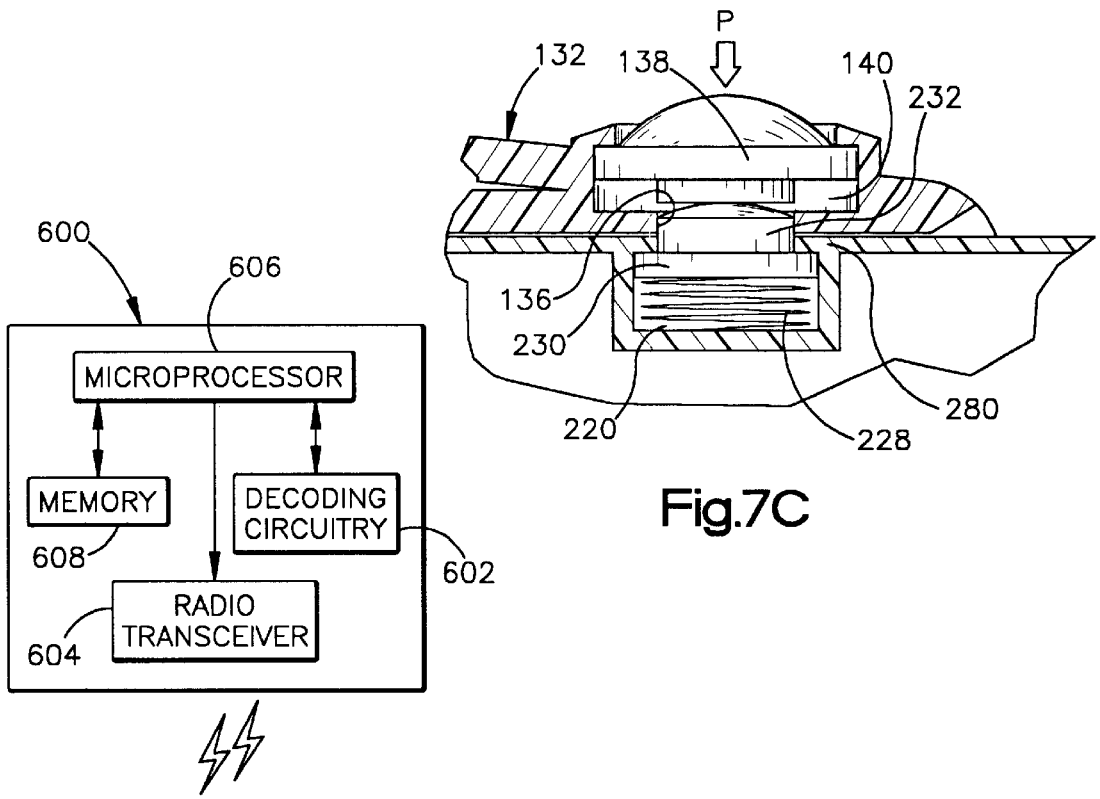
FIG. 7C is a view, partly in side elevation and partly in section, of a portion of a mechanical attachment structure of the dataform reading module to the housing.

An outer surface 70 of the docking station 52 includes two generally planar upper surface 72 and a side surface 74. The upper and side surfaces 72, 74 are substantially perpendicular. The docking station upper surface 72 provides a mechanical and electrical interface for the housing 100. As can best be seen in FIGS. 2, 7, 7A and 7B, the mechanical coupling of the housing 50 to the docking station upper surface 72 is accomplished by the snap fit of two elongated nubs 110 which extend downwardly from a bottom side 112 of the housing 100 into respective slotted openings 80 in the docking station upper surface 72. As can best be seen in FIG. 7A, the nubs 110, when viewed in cross section, flare slightly outwardly from the housing bottom side 112 to assure a securely attachment between the housing 100 and the docking station 52 when the nubs 110 snap into the correspondingly tapered shape slotted openings 80.

The docking station 52 encases a plurality electrical conductors 81 (a portion of which are shown in FIG. 7 and in dashed line in FIG. 7B) which terminate in a multi-pin female connector 86 (such as a standard RS 232 connector). The female connector 86 is mounted in a recess 87 in the docking station upper surface 72. Some of the plurality of electrical conductors 81 couple some pins of the female connector 86 to pins of a multi-pin male connector 82 to make an electrical connection with the visual display screen module 300 via a mating multi-pin female connector 302 of the module (FIG. 2). Other of the plurality of electrical conductors couple other pins of the female connector 86 to a multi-pin male connector 84 to make an electrical connection with the battery pack module 400 via a mating multi-pin female connector 402 of the module. As can best be seen in FIGS. 7 and 7B, the housing 100 includes a multi-pin male connector 120 extending downwardly from the housing bottom side or surface 112. The housing male connector 120 engages the docking station female connector 86 when the housing 100 is snap fit to the docking station upper surface 72. A plurality of electrical conductors 122 (FIGS. 7 and 7B) electrically couple the male connector 120 to electronic circuitry disposed in the housing 100.

Referring now to FIGS. 3, 4 and 5, the dataform reading module 200 is actuated to read a one or two dimensional bar code or matrix dataform through a transparent window 202 disposed in a front side 203 of the module, which preferably is comprised of a housing of durable, impact resistant plastic material. The window 202 is "aimed" at a target dataform 18 affixed, for example, to a section of warehouse shelving or rack 20 and the module 200 is actuated by depressing the button 500 to read the target dataform 18 along the direction X (FIG. 5). The dataform reading module 200 may be a laser scanner, a one or two dimensional charge coupled device (CCD) imaging reader or any other suitable dataform reading device. The dataform reading module 200 is electrically coupled to the electronic circuitry in the housing 100 by a coiled electrical cable 204 (FIG. 2) which is easily stretched when the module is removed from the housing 100 but returns to its coiled shape when the module is reinserted in the housing.

The dataform reading module 200 fits into a recess or cavity 130 (FIG. 7) in a front part 132 of the housing 100. The dataform reading module 200 is releasably retained in the cavity 130 by a spring loaded attachment assembly 134 disposed in the front part 132 of the housing 100 and in vertically aligned recesses 220, 222 in the top and bottom sides 224, 226 of the dataform reading module 200. As can best be seen in FIG. 7C, disposed within the upper recess 220 is a spring 228 which biases a hat shaped member 230 upwardly such that an upper portion 232 of the member 230 extends into an opening 136 in the housing front part 132 to hold the dataform reading module 200 in the cavity 130. A release button 138 is confined within a region 140 above the opening 134. Pushing the button 138 in a direction labeled P in FIG. 7C compresses the spring 228 and moves the upper portion 232 of the hat shaped member 230 downwardly through the opening 134 such that the dataform reading module 200 can be pull outwardly from the housing cavity 130.

Also part of the spring loaded attachment assembly 134 is another spring 240 and hat shaped member 242 disposed in the recess 222 of the dataform reading module 200 (FIG. 200). The spring 240 biases an lower rounded portion 244 of the member 242 into a rounded recess 140 in the housing front part 132. The frictional force between the member rounded portion 244 and the rounded recess 140 helps to hold the dataform reading module 200 in the housing cavity 130 but, the frictional force does not prevent the module 200 from being pulled from the housing cavity 130 when the release button 134 is depressed to release the module.

The housing cavity 130 is arcuately shaped and permits the dataform reading module 200 to be rotated about an axis labeled R—R in FIG. 7. The angle of rotation of the dataform reading module 200 is labeled A in FIG. 4 and is approximately 180 degrees. Rotation of the dataform reading module 200 facilitates reading of dataforms that are oriented to either the left or right side of the operator's body. In a warehouse where the operator is walking down an aisle, rotating the dataform reading module 200 to the right with respect to the housing 100 will facilitate reading dataforms positioned to the operator's right side, while rotating the dataform reading module to the left will facilitate reading dataforms positioned to the operator's left side. The rotational endpoints are shown in dashed line in FIG. 4. When the dataform reading module 200 is released from the housing 100, the coiled electrical cable 204 extends from the opening as shown in FIG. 2 and can be stretched approximately 24 inches from the housing 100. This facilitates reading dataforms above shoulder level or below waist level of the operator. When the dataform reading module 200 is reinserted in the housing cavity 130, the electrical cable 204 is pushed into an open arcuate shaped recessed region 142 at a back end of the housing cavity 130.

The housing 100 supports a small liquid crystal visual display screen 150 (approximately 2 inches by ½ inch) and a small keypad having a plurality of keys 152. Displayed on the screen 150 are data transmitted from the command module 400, for example, if the device 10 is used to facilitate order picking in a warehouse, the name of products to be selected and the quantity of each product needed may advantageously be displayed. Functions of the keys 152 of the keypad include skipping a product displayed as being the next to be picked, scrolling up and down the products listed in a given order, marking down a product picked from inventory and/or indicating to the command module that the number of units of a product available is less than the number ordered.

The battery pack module 400 provides power to electronic circuitry of the housing 100 and the dataform reading assembly 200 through power regulation circuitry 160 (shown schematically in FIG. 8) disposed in the housing 100. The battery pack module 400 is comprised of a plurality of electrically coupled rechargeable battery cells disposed in a plastic housing. The module 400 is removably mounted to the side surface 74 of the docking station 52 and is held in place by four wings 90 (best seen in FIG. 2) extending outwardly from the docking station side surface which snap fit into respective recesses 404 in a side wall 406 of the module 400. As the battery pack module 400 is pushed toward the docking station 52, the wings 90 first deflect outwardly as they contact the side wall 406. As the battery pack module 400 continues to be pushed toward the docking station 52, the wings 90 snap into the side wall recesses 404 to hold the module in place on the docking station.

At the same time, the female connector 402 which is recessed in a back side 408 of the module 400 engages the male connector 84 protruding outwardly from the side surface 74 of the docking station 52 to provide an electrical coupling between the plurality of rechargeable battery cells in the battery pack module 400 and the conductive leads 81 in the docking station 52. Thus, power from the battery pack module 400 is coupled to the housing electronic circuitry through the module female connector 402, the docking station male connector 84, the docking station conductive leads 81, the docking station female connector 86, the housing male connector 120 and the housing conductive leads 121 to the power regulation circuitry 160. Power is supplied to the dataform reading module 200 from the power regulation circuitry 160 through the electrical cable 204.

The display screen module 400 is configured to overlie a front side 410 of the battery pack module 300 and is held in place by two wings 92 (FIG. 2) extending outwardly from the docking station side surface 74 which snap fit into respective recesses 304 in a side wall 306 of the module 300. As the visual display screen module 300 is pushed toward the front side 410 of battery pack module 400, the wings 92 first deflect outwardly as they contact the side wall 306. As the display screen module 300 continues to be pushed toward the battery pack module 400, the wings 92 snap into the side wall recesses 304 to hold the module in place overlying the battery pack module 300.

At the same time, the female connector 302 which protrudes from an upper portion of a back side 408 of the module 300 extends past the battery pack module 400 and the engages the male connector 82 protruding outwardly from the side surface 74 of the docking station 52 to provide an electrical coupling between circuitry in the display screen module 300 and the conductive leads 81 in the docking station 52. The engagement of the connectors 82, 302 is best seen in FIG. 6.

The display screen module 300 includes a liquid crystal display screen 310 in a front side 312 of the module. The display screen 310 is approximately 2½ inches by 2 inches. Display driver circuitry 162 disposed in the housing 100 and operating under the control of a microprocessor 164 and the command module 600 causes the same data to be displayed on the housing display screen 150 and the display module display screen 310. Since the display screen 310 is larger, additional data is also displayed. The provision of two display screens 150, 310 permits the operator to view a display whether his or her arm is directed to reading dataforms located to the left or right side of his or her body.

Figure 8:
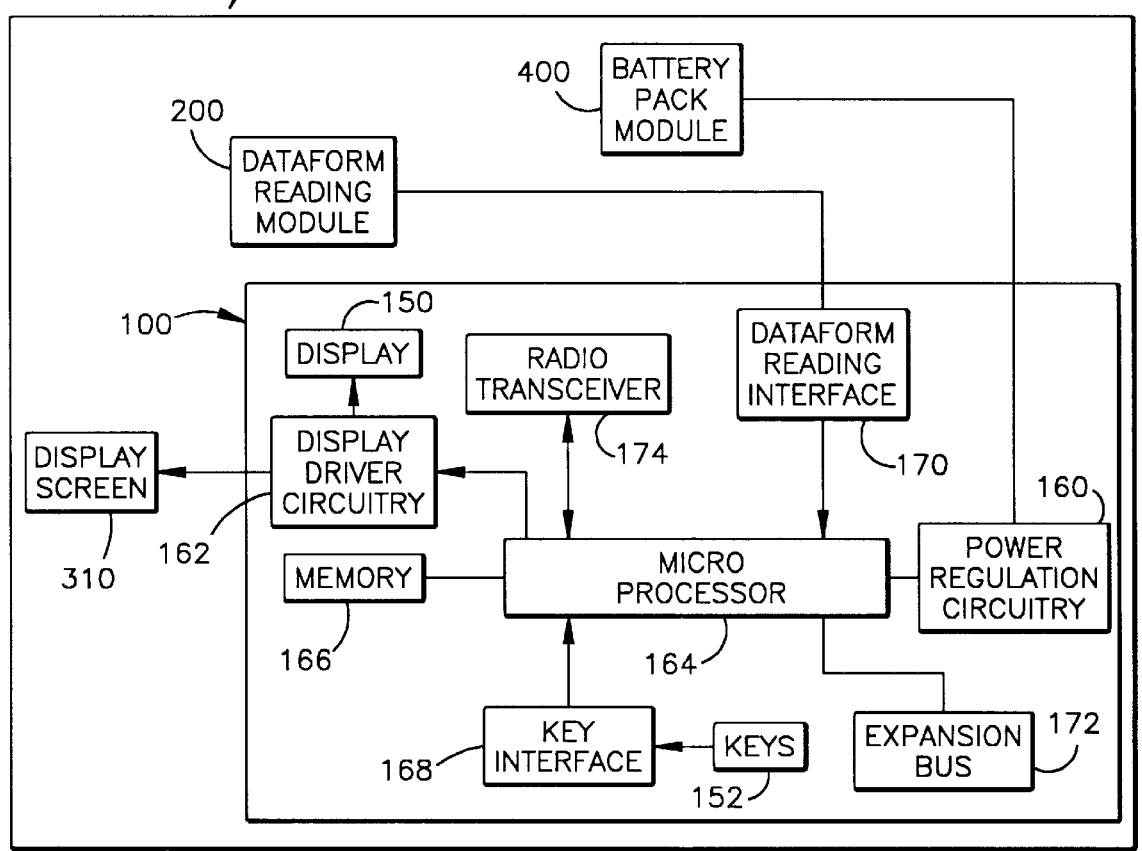
FIG. 8 is a schematic diagram of selected electronic circuitry and systems of the portable data collection device of FIG. 1.

Turning to FIG. 8, the housing 100 supports electronic circuitry of the portable data collection device 10 including the microprocessor 164, the display driver circuitry 162 and the power regulation circuitry 160. The housing electronic circuitry further includes a random access memory 166, key interface circuitry 168 receiving signals from the keys 152 when depressed, dataform reading module interface circuitry 170 and an expansion bus 172. The housing 100 also supports a radio transceiver 174 such as a microradio or a PCMCIA radio which is used to transmit signals representing a read dataform to the command module 600 and to receive signals from the command module corresponding to data to be displayed on the display screens 150, 310, e.g., product name and product identification number corresponding to a read (imaged or scanned) dataform 18, order information such as the number of units of the product to be selected plus data retrieved from a remote host computer 602 (shown schematically in FIG. 9) via a cellular communications network 604.

The command module 600 includes decoding circuitry 602 to decode the signals representing the imaged or scanned dataform 18. The command module 600 also includes a radio transceiver 604 which communicates with the host computer 602 to update data in or retrieve data from a database 605 (FIG. 9) accessed by the host computer. The command module 600 also includes a memory 608 to store data.

Figure 9:
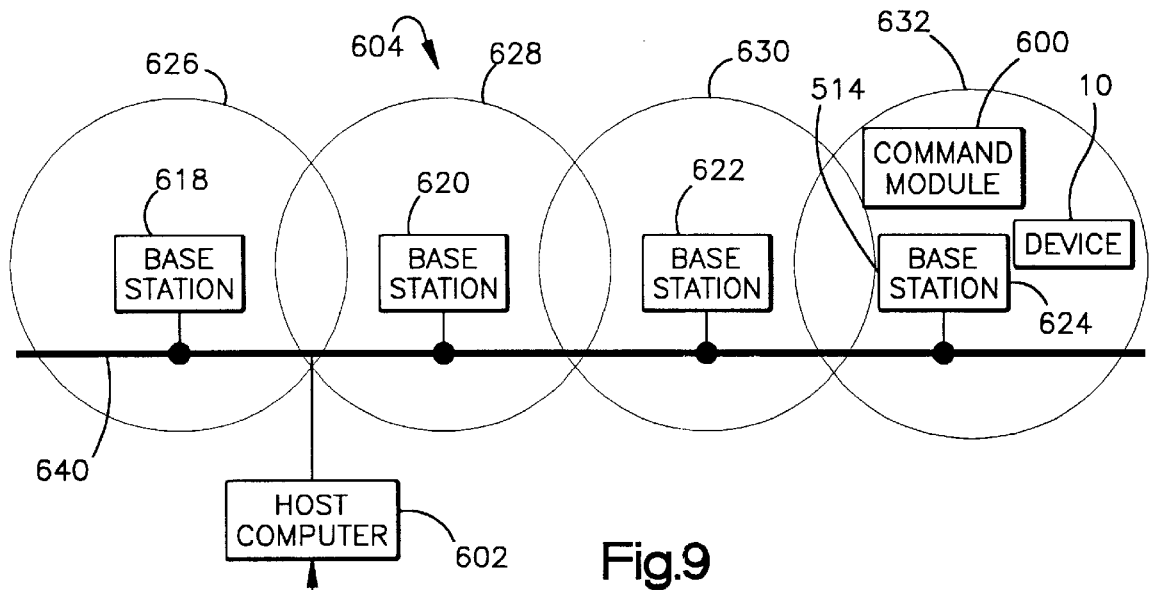
FIG. 9 is a schematic representation of a direct spread spectrum cellular communications network providing for communication between the portable data collection device of FIG. 1 and a command module.

Turning to FIG. 9, the command module 600 communicates at least a portion of the decoded dataform data to the host computer 602 utilizing a cellular communications network shown generally at 604. The communications network comprises a plurality of base stations 618, 620, 622, 624 each having a generally circular transmission and receiving zone or cell 626, 628, 630, 632. The base stations 618, 620, 622, 624 are hardwired to a backbone 640 of the communications network 506. The host computer 602 is also hardwired to the backbone 640. As illustrated in FIG. 9, the command module 600 and the portable data collection device 10 are in the communication cell 632 of the base station 624, thus, the command module communicates with the host computer 602 via rf signal transmitted to and from the base station 624.

Figure 10:
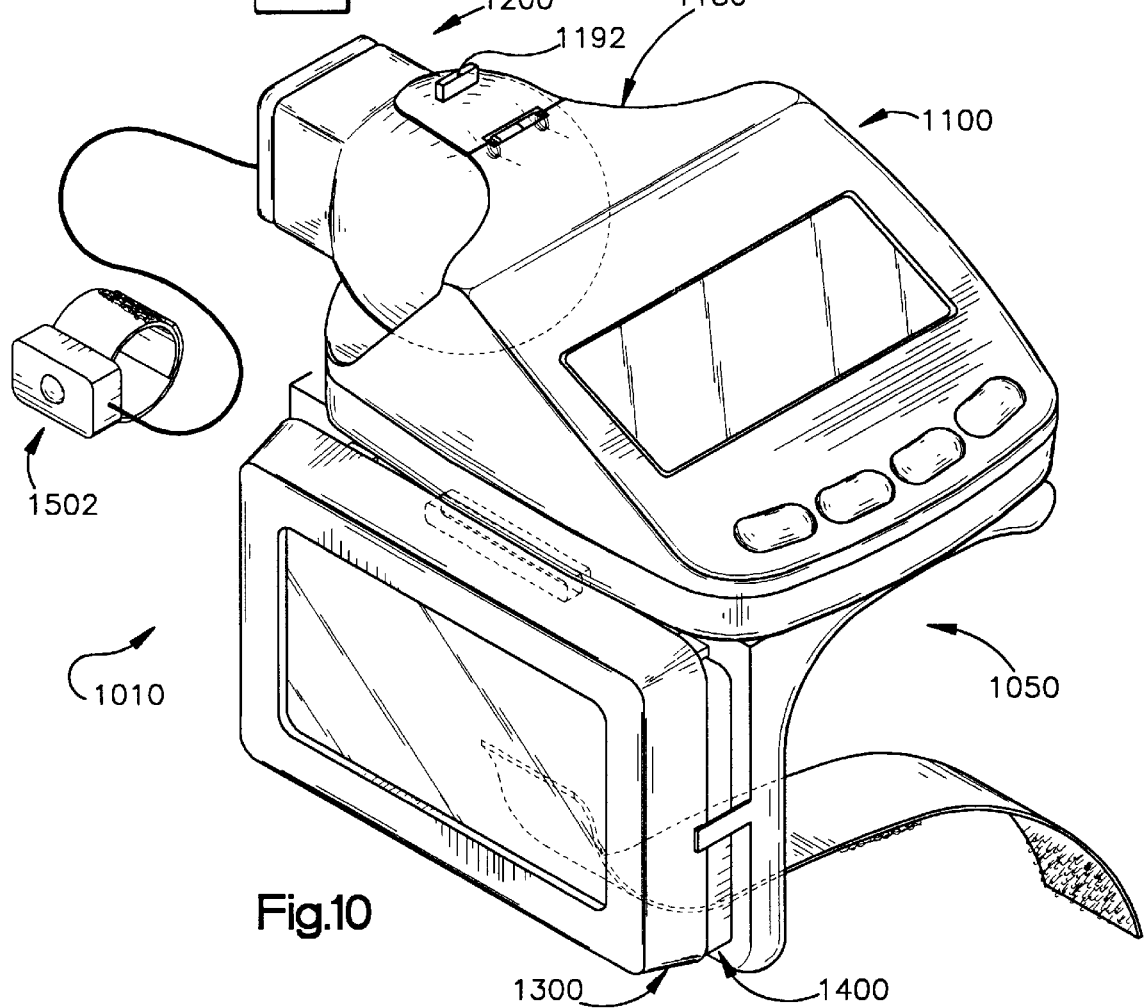
FIG. 10 is a perspective view of a second embodiment of the portable data collection device of the present invention.
Figure 11:
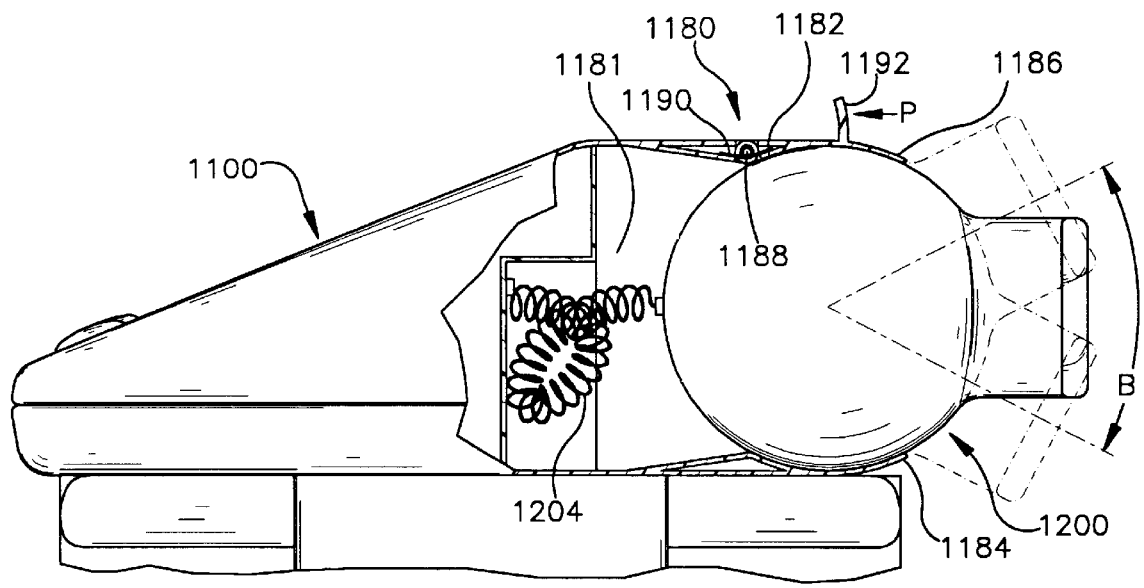
FIG. 11 is a view, partly in side elevation and partly in section, of the portable data collection device of FIG. 10.
Figure 12:
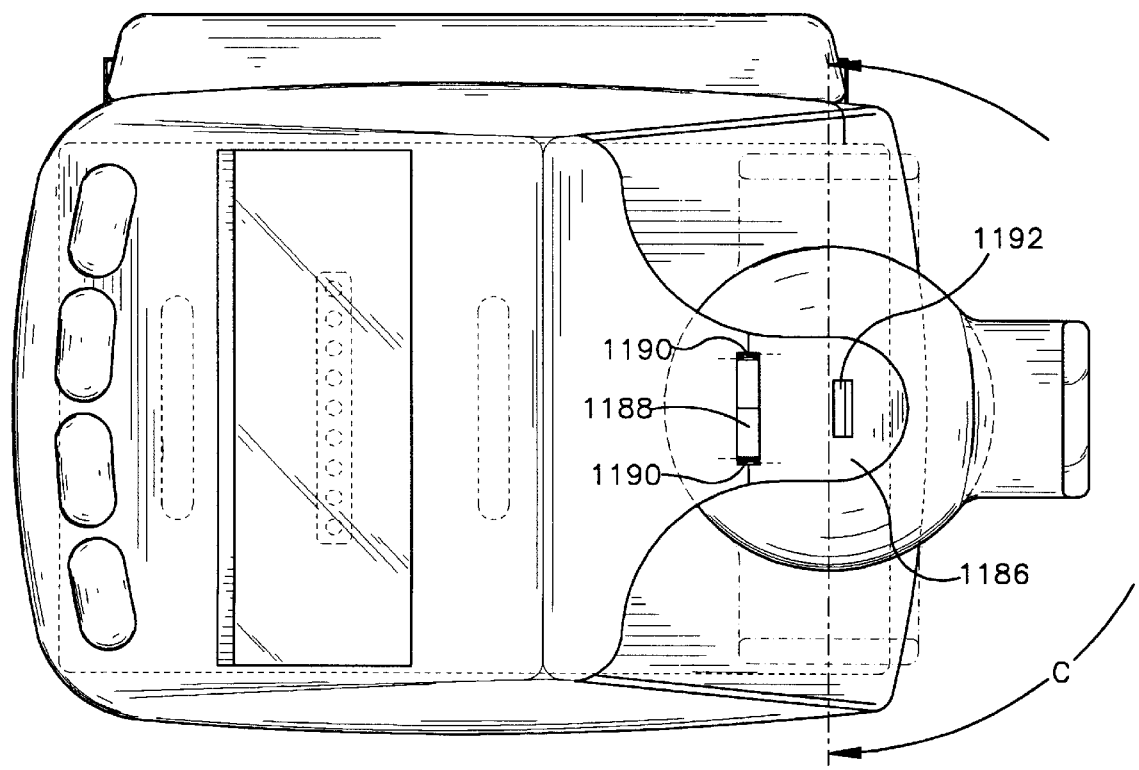
FIG. 12 is a top plan view of the portable data collection device of FIG. 10.

A second embodiment of the portable data collection device of the present invention is shown as 1010 in FIGS. 10–12. The device 1010 includes an arm mounting assembly 1050, a housing 1100, a dataform reading module 1200 having a light bulb shaped housing, a visual display screen module 1300, a battery pack module 1400 and an dataform reading actuation assembly including a switch 1502. Except as described below, the assembly and structure of the components and modules of the portable data collection device 1010 are the same as the corresponding components and modules of the first embodiment portable data collection device 10.

In the second embodiment, a dataform reading module 1200 is rotatable both vertically and horizontally with respect to the housing 1100. As can be seen in FIGS. 11 and 12, the dataform reading module 1200 has a pivoting movement with respect to the housing 1100 of approximately 30 degrees (labeled B in FIG. 11) in the vertical direction and 180 degrees labeled C in FIG. 12) in the horizontal direction.

The housing 1100 includes a front portion 1180 defining a cavity 1181 and having top and bottom arcuate shaped supports 1182, 1184 for rotatably supporting the dataform reading module 1200. A distal portion 1186 of the top support 1182 is hinged to the remainder of the support via a hinge 1188. The hinge 1188 permits the top support distal portion 1186 to pivot upwardly when sufficient pressure is applied in direction P (FIG. 11) to a tab 1192 to overcome the downward bias of a pair of springs 1190. When the top support distal portion 1186 pivots upwardly, the dataform reading module 1200 is released and can be removed from the cavity 1181. As in the first embodiment of the portable data collection device, electronic circuitry in the dataform reading module 1200 is electrically coupled to electronic circuitry disposed in an interior region of the housing 1100 by a coiled electrical cable 1204. When the dataform reading module 1200 is removed from the housing 1100, the cable stretches to permit an operator to move the dataform reading module to a position that facilitates reading dataforms above shoulder level or below waist level.

Although the portable data collection devices 10, 1010 disclosed in the first and second embodiments utilize rf transmissions to communicate with the command module 600, it should be appreciated that other wireless communication methods may be used, for example, infared data transmission between the portable data collection device and the command module. Also, the portable data collection device may be wired to the command module 600. It should also be appreciated that the portable data collection device may be provided with suitable decoding circuitry to decode a read dataform and a suitable radio transceiver to communicate with the host computer 602 through the cellular communications network 604 thereby reducing the need for or eliminating the need for the command module 600. 164

While the present invention has been described with a degree of particularity, it is the intent that the invention include all modifications and alterations from the disclosed design falling within the spirit and scope of the appended claims.

I claim:

1. An arm mounted portable data collection device comprising:

a) a housing defining an interior region in which electronic circuitry of the device is disposed, the housing including a cavity at least partially defined by an extending front part of the housing;

b) a battery pack module for supplying electric power to the electronic circuitry of the device;

c) an arm mounting assembly adapted to be releasably secured to a lower portion of an arm and a wrist of an operator, the arm mounting assembly including a docking station having an outer surface including a generally planar upper surface and a generally planar side surface, the docking station including interfacing circuitry comprising a plurality of electrical conductors extending between the upper surface and the side surface;

d) a dataform reading module actuatable for reading a target bar code dataform in a target area of the dataform reading module, the dataform reading module being supported in the cavity of the housing and being electrically coupled to the electronic circuitry disposed in the housing, the module being removable from the cavity and being actuatable to read a target dataform both while being supported in the cavity and when removed from the cavity;

e) an actuation assembly electrically coupled to the electronic circuitry disposed in the housing and including a switch to initiate reading of a target dataform, the actuation assembly adapted to be releasably mounted to an index finger of the hand of the operator and configured such that the switch is positioned on a thumb-facing side of the index finger; and f) the docking station side surface being configured to releasably receive the battery pack module and the docking station upper surface being configured to releasably receive the housing such that the extending front part of the housing is facing away from the operator, the docking station interfacing circuitry electrically coupling the battery pack module to the electronic circuitry disposed in the housing.

2. The arm mounted portable data collection device of claim 1 wherein the housing supports a radio transceiver electrically coupled to the electronic circuitry in the housing, the radio transceiver transmitting data representative of a target dataform read by the dataform reading module to a remote command module, the data including undecoded dataform data of the target dataform.

3. The arm mounted portable data collection device of claim 1 further including a first visual display screen supported by a back part of the housing and electrically coupled to the electronic circuitry of the device and a second visual display screen releasably attached to the docking station side surface and electrically coupled to the docking station interfacing circuitry.

4. The arm mounted portable data collection device of claim 3 wherein the battery pack module is disposed between the second visual display screen and the docking station side surface.

5. The arm mounted portable data collection device of claim 3 wherein the battery pack module includes a plurality of rechargeable battery cells.

6. The arm mounted portable data collection device of claim 3 wherein the radio transceiver receives data transmitted from the command module and displays at least a portion of the received data on the first visual display screen and the second visual display screen.

7. The arm mounted portable data collection device of claim 1 wherein the docking station upper surface is substantially orthogonal to the docking station side surface.

8. The arm mounted portable data collection device of claim 3 wherein the housing supports a keypad having a plurality of keys electrically coupled to the electronic circuitry of the housing, the keys adapted to be used by the operator to input data and commands to the electronic circuitry and the command module and to modify data displayed on the first and second visual display screens.

9. The arm mounted portable data collection device of claim 1 wherein the extending front part of the housing includes a first support and a spaced apart second support and the dataform reading module is rotatably supported between the top and bottom supports, the module being rotatable with respect to the housing along an axis of rotation extending through the first and second supports.

10. The arm mounted portable data collection device of claim 9 wherein the axis of rotation extending through the first and second supports is substantially orthogonal to the docking station upper surface.

11. A data collection system comprising:
a) an arm mounted portable data collection device including:
 i) a housing defining an interior region in which electronic circuitry of the device is disposed, the housing including a cavity at least partially defined by an extending front part of the housing;
 ii) a battery pack module for supplying electric power to the electronic circuitry of the device;
 iii) an arm mounting assembly adapted to be releasably secured to a lower portion of an arm and a wrist of an operator, the arm mounting assembly including a docking station having an outer surface including a generally planar upper surface and a generally planar side surface, the docking station including interfacing circuitry comprising a plurality of electrical conductors extending between the upper surface and the side surface; and
 iv) a dataform reading module actuatable for reading a target bar code dataform in a target area of the dataform reading module, the dataform reading module being supported in the cavity of the housing and being electrically coupled to the electronic circuitry disposed in the housing, the module being removable from the cavity and being actuatable to read a target dataform both while being supported in the cavity and when removed from the cavity;
 v) an actuation assembly electrically coupled to the electronic circuitry disposed in the housing and including a switch to initiate reading of a target dataform, the actuation assembly adapted to be releasably mounted to an index finger of a hand of the operator and configured such that the switch is positioned on a thumb-facing side of the index finger; and
 vi) the docking station side surface being configured to releasably receive the battery pack module and the docking station upper surface being configured to releasably receive the housing such that the extending front part of the housing is facing away from the operator, the docking station interfacing circuitry electrically coupling the battery pack module to the electronic circuitry disposed in the housing; and
b) a command module having a radio transceiver and dataform decoding circuitry, the command module receiving data representative of a target dataform read by the dataform reading module, decoding the data representative of the target dataform to generate decoded dataform data and transmitting at least a portion of the decoded data to the arm mounted portable data collection device.

12. The data collection system of claim 11 wherein the arm mounted portable data collection device further includes a first visual display screen supported by a back part of the housing and electrically coupled to the electronic circuitry of the device and a second visual display screen releasably attached to the docking station side surface and electrically coupled to the docking station interfacing circuitry.

13. The data collection system of claim 12 wherein the battery pack module of the arm mounted portable data collection device further is disposed between the second visual display screen and the docking station side surface.

14. The data collection system of claim 12 wherein the housing of the arm mounted portable data collection device further supports a radio transceiver electrically coupled to the electronic circuitry of the device, the radio transceiver operating to transmit data representative of a target dataform to the command module and to receive data transmitted from the command module, at least a portion of the decoded dataform data transmitted by the command module being displayed on the first visual display screen and the second visual display screen.

15. The data collection system of claim 11 wherein the upper surface of the docking station of the arm mounted portable data collection device is substantially orthogonal to the docking station side surface.

16. The data collection system of claim 12 wherein the arm mounted portable data collection device housing the housing supports a keypad having a plurality of keys electrically coupled to the electronic circuitry of the housing, the keys adapted to be used by the operator to input data and commands to the electronic circuitry and the command module and to modify data displayed on the first and second visual display screens.

17. The data collection system of claim 11 wherein the extending front part of the arm mounted portable data collection device includes a first support and a spaced apart second support and the dataform reading module is rotatably supported between the top and bottom supports.

18. The data collection system of claim 17 wherein the arm mounted portable data collection reading module is rotatable with respect to the housing along an axis of rotation extending through the first and second supports.

19. The data collection system of claim 18 wherein the axis of rotation extending through the first and second supports is substantially orthogonal to the docking station upper surface.

20. The data collection system of claim 11 wherein at least a portion of the decoded dataform data is transmitted by the command module to a remote host computer via a cellular communications network.

* * * * *